United States Patent [19]

Kiesel

[11] Patent Number: 5,288,086
[45] Date of Patent: Feb. 22, 1994

[54] COMPOSITE ROD WIPER

[75] Inventor: Mark J. Kiesel, Peoria Heights, Ill.

[73] Assignee: Caterpillar, Inc., Peoria, Ill.

[21] Appl. No.: 960,332

[22] Filed: Oct. 13, 1992

[51] Int. Cl.$^5$ .............................................. F16J 15/32
[52] U.S. Cl. ..................... 277/152; 277/165; 277/206 R; 277/228
[58] Field of Search ........... 277/152, 165, 205, 206 R, 277/227, 228, 24, 178, 184, 212 C

[56] References Cited

U.S. PATENT DOCUMENTS

| | | | |
|---|---|---|---|
| 3,057,630 | 10/1962 | Sneed | 277/165 |
| 3,469,854 | 9/1969 | Linwood | 277/227 |
| 3,642,290 | 2/1972 | Millsap | 277/24 |
| 3,866,923 | 2/1975 | Gorman | 277/24 |
| 3,920,254 | 11/1975 | Johnston et al. | 277/206 R |
| 4,141,563 | 2/1979 | Wu | 277/152 |
| 4,328,972 | 5/1982 | Albertson et al. | 277/228 |
| 4,618,153 | 10/1986 | Nilsson | 277/152 |

*Primary Examiner*—William A. Cuchlinski, Jr.
*Assistant Examiner*—Daniel G. De Pumpo
*Attorney, Agent, or Firm*—O. Gordon Pence

[57] ABSTRACT

A composite rod wiper for an end cap of a hydraulic cylinder is disclosed for wiping the cylindrical exterior surface of an extensible and retractable rod extending through the end cap. The rod wiper includes a wiper ring of a first, hard and wear resistant elastomeric material. The wiper ring has a generally Vee shaped cross-sectional configuration having a radially inner acute wiper lip, an outer leg and an inner leg, each leg extending radially and axially inwardly in a diverging relation from each other from the wiper lip, and a cavity disposed intermediate the inner and outer legs. An energizer ring of a second, softer and more resilient elastomeric material is disposed in the cavity of the wiper ring. The composite rod wiper 10 provides wiper that has a long wear life, while at the same time maintaining the wiper lip in continuous wiping contact with the rod surface at a sufficient radial force level to ensure proper cleaning action throughout its useful life and during all temperature extremes.

4 Claims, 1 Drawing Sheet

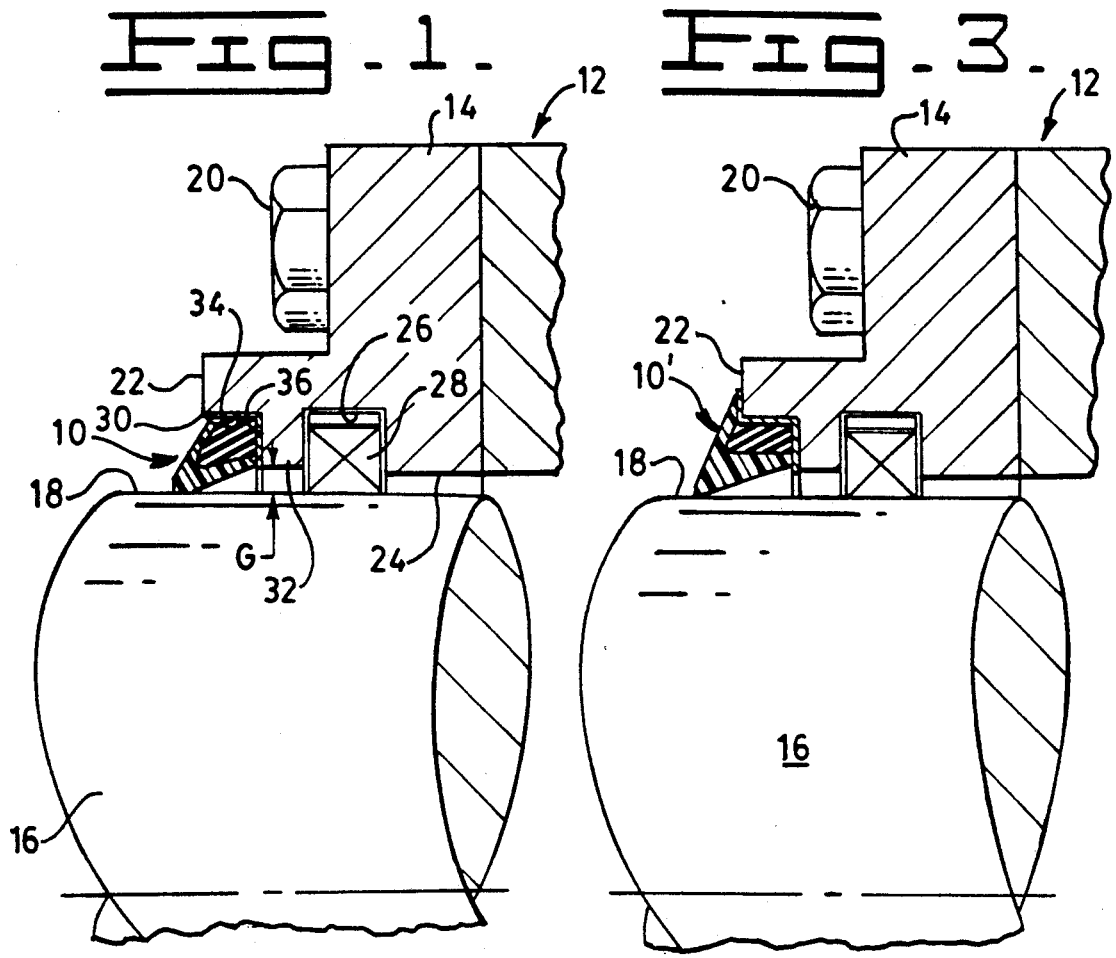
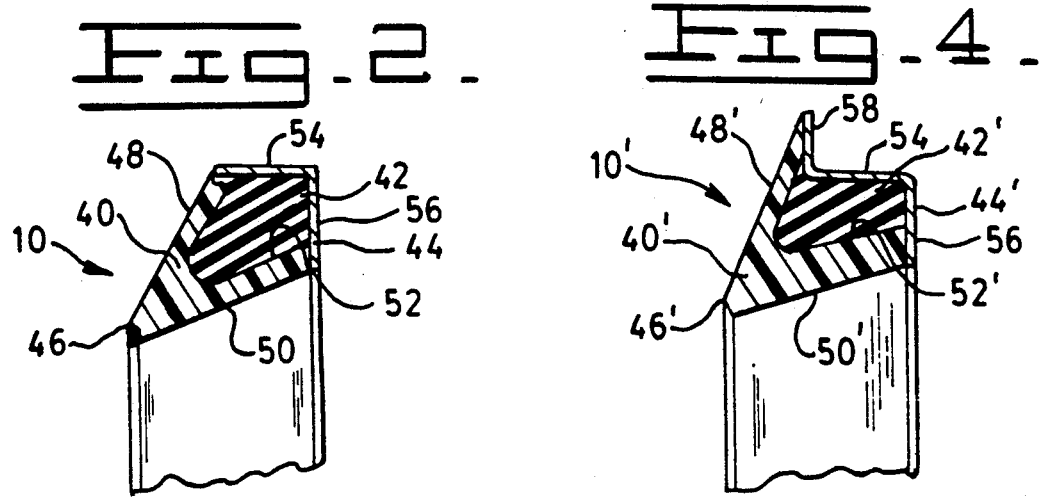

COMPOSITE ROD WIPER

TECHNICAL FIELD

This invention relates generally to wipers for extensible and retractable piston rods of hydraulic cylinders and the like and, more particularly, to an improved composite rod wiper with a wiper ring of a highly abrasion resistant elastomer material and an integral energizer ring of a softer, more resilient elastomeric material.

BACKGROUND ART

Large earthmoving vehicles, such as tractors, loaders, off-highway trucks, and the like employ hydraulic jacks and/or suspension struts that are exposed to all varieties of dirt, debris, moisture and other abrasive contaminants. It is well known that such contaminants are injurious to the seals, bearings and other components of such jacks or struts. Accordingly, it has been the practice to use rod wipers to wipe the rod clean as it is retracted into the cylinder so as to reduce to the maximum extent possible the amount of contaminants reaching the seals and bearings. U.S. Pat. Nos. 3,866,923 issued Feb. 18, 1975 to Gerald W. Gorman and 4,618,153 issued Oct. 21, 1986 to Rolf Nilsson both disclose rod Wipers for this purpose.

In order to satisfactorily perform the desired wiping function, such wipers must remain in continuous wiping contact with the rod as it moves back and forth through the wiper. Also, the wiping contact must be applied with a sufficient radial force to ensure the desired cleaning action on the rod. These tasks are complicated in earthmoving applications by the fact that extreme side loads are exerted on the rods of hydraulic cylinders in operation, which causes the rapid radial displacement of the rod relative to the wiper as the rod moves axially in and out of the cylinder and also by the fact that earthmoving vehicles work in conditions ranging from arctic to tropic temperatures extremes. Prior wipers have been made of rubber to attain this necessary resiliency and responsiveness. However, rubber is relatively soft and susceptible to a high wear rate. Harder plastic materials, such as polyurethane for instance, exhibit much greater wear resistance. Unfortunately, two problems exists with the use of such harder materials. First, harder materials have lower creep resistance. This allows the radial force they exert on the rod to lessen over time, allowing debris to get past the wiper. Second, they have a much lower response rate, particularly at extremely low temperatures, due to their higher flex modulus and decreased resiliency at arctic temperatures. In other words, such materials do not respond quickly enough to afford their movement with the rapid radial displacements of the rod. This causes the wiper to leave contact with the rod and also allows debris to get past the wiper.

The present invention is directed to overcoming the shortcomings of the prior attempts at providing a resilient wiper with acceptable wear life.

Disclosure of the Invention

In accordance with one aspect of the present invention, there is provided a composite rod wiper for an end cap of a hydraulic cylinder for wiping the cylindrical exterior surface of an extensible and retractable rod extending through the end cap. The rod wiper includes a wiper ring of a first, hard and wear resistant elastomeric material. The wiper ring has a generally Vee shaped cross-sectional configuration having a radially inner acute wiper lip, an outer leg and an inner leg, each leg extending radially outwardly and axially inwardly in a diverging relation from each other from the wiper lip, and a cavity disposed intermediate the inner and outer legs. An energizer ring of a second, softer and more resilient elastomeric material is disposed in the cavity of the wiper ring.

Brief Description of the Drawings

FIG. 1 is a fragmentary cross-sectional view of a portion of a hydraulic cylinder in which a composite rod wiper embodying the principles of the present invention is employed;

FIG. 2 is an enlarged cross-sectional view of the wiper shown in FIG. 1 by itself;

FIG. 3 is a view similar to FIG. 1, but showing an alternate embodiment of the rod wiper; and FIG. 4 is a view similar to FIG. 2 of the alternate rod wiper of FIG. 3.

Best Mode for Carrying Out the Invention

Referring more particularly to the drawings, a composite rod wiper embodying the principles of the present invention is generally indicated at 10 in FIGS. 1 and 2 for use in a hydraulic cylinder 12. As used herein, the term hydraulic cylinder is defined broadly to mean any hydraulic device having an extensible and retractable piston rod, including, but not limited to, hydraulic jacks and motors and suspension struts of the type used on construction or earthmoving vehicles and the like.

Hydraulic cylinder 12 includes a cylinder head or end cap 14 and a piston rod 16. Piston rod 16 is provided with a smoothly finished cylindrical exterior surface 18. The end cap 14 is secured in any suitable manner, such as by bolts 20, to the cylinder 12 and includes a planar end surface 22 having a stepped rod bore 24 therethrough. A seal groove 26 is provided in the bore 24 for receiving a rod seal 28 that seals against the cylindrical surface 18 of the rod 16. The end cap 14 is also provided with a counterbore 30 at the end of the bore 24 for receiving the wiper 10, as will hereinafter be described. The seal groove 26 and the counterbore 30 are spaced apart to provide a land portion 32 of the bore 24 therebetween. The land portion 32 is provided with an inner diameter of a size to provide a clearance gap "G" between it and the rod surface 18. The counterbore 30 includes a cylindrical surface portion 34 having an outer end adjacent the planar surface 22 and a radial surface portion 36 extending from the cylindrical surface portion 34 to the land portion 32 of the rod bore 24.

As best shown in FIG. 2, the composite rod wiper 10 of the present invention is preferably constructed of three components, including a wiper ring 40, an energizer ring 42 and a mounting ring 44.

The wiper ring 40 is made of a first, highly wear resistant elastomeric material. Preferably, wiper ring 40 is made of polyurethane having a hardness within a range of from 40 to 80 Shore D durometer. If ring 40 is softer than 40 Shore D durometer it will exhibit a higher wear rate than desired. If it is harder than 80 Shore D durometer it will be less likely to seal out water, other liquids, and fine particles. As best seen in FIG. 2, wiper ring 40 is provided with a generally Vee shaped cross-sectional configuration that appears to be tilted to one side. This configuration provides the wiper ring 40 with a radially inner acute wiper lip 46 having an outer leg 48 and an inner leg 50. In particular, the outer leg 48 extends axially outwardly from the apex of the wiper lip 46 to a point adjacent the planar surface 22 and the inner leg 50 extends axially outwardly from the lip apex to a point adjacent the land portion 32 of the rod bore 24. An open cavity 52 is thus created in the wiper ring intermediate the legs 48,50.

The energizer ring 42 is made of a second, softer and more resilient elastomeric material. Preferably, energizer ring 42 is made of a silicone rubber having a hardness within a range of from 40 to 90 Shore D durometer. If ring 42 is softer than 40 Shore D durometer it will not be able to apply sufficient lip load to scrape debris off rod. If it is harder than 90 Shore A durometer it will not conform to rod movements or it will apply too much load to the lip causing accelerated wear. The energizer ring 42 is located in the cavity 52, as will hereinafter be more fully described.

The mounting ring 44 preferably has an L-shaped cross-sectional configuration, including a cylindrical leg 54 and a radial leg 56, and is made of steel or other rigid material. The cylindrical leg 54 is sized to be received in a press fit relation with the cylindrical surface portion 34 of the counterbore 30 for purpose of mounting the wiper 10 to the end cap 14, with the radial leg 56 in abutment against the radial portion 36 of the counterbore 30.

As can be seen in the drawings, the mounting ring 44 closes the open cavity 52 of the wiper ring 40. The energizer ring 42 completely fills the closed cavity thus formed. The energizer ring 42 is secured by bonding to both the wiper ring 40 and the mounting ring 44 to form a composite member that is the rod wiper 10. This arrangement may be accomplished by molding the rubber energizer ring 42 in a suitable mold that contains the mounting ring 44 to which a suitable adhesive has been pre-applied. Next, the polyurethane material of the wiper ring 40 can be molded and secured to the energizer ring 42 and to the distal ends of the legs 54,56 of the mounting ring 44 in a second mold containing the energizer ring 42 and mounting ring 44.

It is also contemplated that the cavity 52 of the wiper ring 40 be closed by means of a thin wall (not shown) of the wiper ring extending between the legs 48,50 of the wiper ring 42 along the legs 54,56 of the mounting ring 44. In this arrangement, only the wiper ring 40 would be secured to the mounting ring 44, while the energizer ring 42 would be completely encapsulated within the wiper ring 40. This could be accomplished by molding the polyurethane material of the wiper ring 40 about the rubber of the energizer ring 42 in a suitable mold that contains the mounting ring 44.

An alternate embodiment of the present invention is depicted in FIGS. 3 and 4, wherein like components and features have like reference numerals and modified components and features have like numerals followed by a prime symbol. New components and features of components have new reference numbers. Also, a description of like components will not be hereinafter repeated, it being understood that the prior description of such like components contained herein for embodiment of FIGS. 1 and 2 applies to the embodiment depicted FIGS. 3 and 4 as well. Only the differences between the embodiments will be hereinafter described.

The principal difference in the embodiment depicted in FIGS. 3 and 4 is the inclusion of a second radial leg 58 on the mounting ring 44', which extends outwardly form the distal end of the cylindrical leg 54. Such second radial leg 58 extends upwardly along and abuts the planar surface 22 of the head 14. Another difference is that the inner leg 50' is made somewhat thicker, while the outer leg 48' extends upwardly at a somewhat greater angle and attaches to the second radial leg 58 of the mounting ring 44'. The more upright positioning of the outer leg 48' is advantageous in providing the rod wiper 10' with grater radial stiffness. Finally, the shape of the cavity 52' and the like shaped energizer ring 42' are less symmetrical than in the FIG. 1 embodiment.

Industrial Applicability

The composite rod wiper 10,10' constructed in accordance with the teachings of the present invention advantageously provides a wiper that has a long wear life, while at the same time maintaining the wiper lip 46 in continuous wiping contact with the rod surface 18 at a sufficient radial force level to ensure proper cleaning action throughout its useful life and during all temperature extremes. The former objective is accomplished by the use of a high wear resistant elastomer material, such as polyurethane, for the wiper ring 40,40'. The latter is accomplished by the use of an integral energizer ring 42,42' made of a highly resilient elastomeric material, such as silicone rubber. Toward this end, it should be recognized that the lip 46,46' of the wiper ring 40,40' is provided with a diameter in its free state, as shown in FIGS. 2 and 4, that is sufficiently smaller than the diameter of the rod 16 such that the wiper lip 46,46' is stretched when the rod 16 is inserted through the wiper lip opening, as shown in FIG. 1. This stretching is effective in compressively loading the energizer ring 42,42' so as to exert a radial force on the wiper lip 46,46' for maintaining the lip in intimate contact with the surface 18 of the rod 16. As the rubber of the energizer ring 42,42' is highly responsive and is continually exerting its radial force on the wiper lip 46,46', the energizer ring 42,42' compensates for the sluggish response rate of the harder polyurethane material of the wiper ring 40,40'.

Thus it can be seen that each material contributes its best characteristics toward accomplishing the desired wiping functions without the encountering the adverse effects of their undesirable characteristics.

Also, as best seen in FIGS. 1 and 3, the wiper 10,10' projects axially outwardly and radially downwardly from the planar end surface 22 of the end cap 14 to the rod surface 18, thus forming a continuous ramp-like configuration between the end surface 22 and the rod surface 18. This ramp configuration eliminates any cavities or areas for debris to collect and is effective in shedding debris away from the rod 16.

Other aspects, objects and advantages of the present invention can be obtained for a study of the drawings, the disclosure and the appended claims.

I claim:

1. A composite rod wiper for an end cap of a hydraulic cylinder for wiping the cylindrical exterior surface of an extensible and retractable rod extending through said end cap, comprising:

a wiper ring of a first, hard and wear resistant elastomeric material, said wiper ring being of a generally Vee shaped cross-sectional configuration having a radially inner acute wiper lip, an outer leg and an inner leg, each leg extending radially outwardly and axially inwardly in a diverging relation from each other from said wiper lip, and a cavity disposed intermediate said inner and outer legs;

an energizer ring of a second, softer and more resilient elastomeric material, said energizer ring being disposed in said cavity of said wiper ring.

2. The rod wiper of claim 1 wherein said first material of said wiper ring is polyurethane and said second material of said energizer ring is silicone rubber.

3. The rod wiper of claim 2 wherein said end cap includes a planar end surface having a rod bore therethrough and with a counterbore about said rod bore, and wherein said rod wiper includes a radially outer steel mounting ring for mounting said wiper in said counterbore.

4. The rod wiper of claim 3 wherein said rod bore adjacent said counterbore is of a diameter sufficiently greater than said rod so as to create a clearance gap therebetween and said counterbore has a cylindrical surface portion having an outer end adjacent said planar surface and a radial surface portion extending from said cylindrical surface portion to said rod bore, and wherein said outer leg extends from the wiper lip to a point adjacent said planar surface and said inner leg extends from the lip to a point adjacent said rod bore.

* * * * *